(12) United States Patent
Mamontov

(10) Patent No.: US 8,209,470 B2
(45) Date of Patent: Jun. 26, 2012

(54) CPU DATA BUS PLD/FPGA INTERFACE USING DUAL PORT RAM STRUCTURE BUILT IN PLD

(75) Inventor: Victor Mamontov, Maple (CA)

(73) Assignee: Honeywell International Inc., Morristown, NJ (US)

( * ) Notice: Subject to any disclaimer, the term of this patent is extended or adjusted under 35 U.S.C. 154(b) by 582 days.

(21) Appl. No.: 12/421,822

(22) Filed: Apr. 10, 2009

(65) Prior Publication Data

US 2010/0262754 A1 Oct. 14, 2010

(51) Int. Cl.
*G06F 12/02* (2006.01)
*G11C 8/00* (2006.01)

(52) U.S. Cl. .............. 711/103; 711/149; 365/230.05; 365/230.08

(58) Field of Classification Search .............. 711/149, 711/103; 365/230.05, 230.08
See application file for complete search history.

(56) References Cited

U.S. PATENT DOCUMENTS

| | | | |
|---|---|---|---|
| 5,454,095 A | 9/1995 | Kraemer | |
| 5,627,986 A | 5/1997 | Frankland | |
| 5,881,228 A * | 3/1999 | Atkinson et al. | 709/210 |
| 6,166,963 A | 12/2000 | Wen | |
| 6,195,178 B1 | 2/2001 | Kotani | |
| 6,247,101 B1 | 6/2001 | Settles | |
| 7,248,663 B2 | 7/2007 | Jeong | |
| 7,536,669 B1 * | 5/2009 | Anderson | 716/138 |

* cited by examiner

*Primary Examiner* — Richard Elms
*Assistant Examiner* — Hien Nguyen
(74) *Attorney, Agent, or Firm* — Shimokaji & Assoc., PC

(57) ABSTRACT

A programmable logic device may include first and second ports in data communication with a memory block including a pair of address areas. A system using the programmable logic device may include the programmable logic device in data communication with a central processing unit and a controller. A method of using the programmable logic device may include generating a command from the central processing unit based on data read from one of the address areas and written to the second address area wherein the address areas are associated with a common memory address.

16 Claims, 2 Drawing Sheets

CPU DATA BUS PLD/FPGA INTERFACE USING DUAL PORT RAM STRUCTURE BUILT IN PLD

GOVERNMENT RIGHTS

This invention was made with the support of the United States Government under Contract N00019-02-C-3002 issued by the Joint Strike Fighter Program (JSF-35), which is funded by multiple entities of the U.S. Government. The Government may have certain rights to this invention.

BACKGROUND OF THE INVENTION

The present invention generally relates to data processing interfaces and more particularly, to an interface between a central processing unit and a programmable logic device.

In some input/output channel applications, data transferred between the channels and a central processing unit may be lost due to data conflicts or data being overwritten during transfer. The data transfer may be organized on a packet basis and transferred in data clusters according to the type of data flowing and the type of input/output channels used. In some instances, the channels use asynchronous data flow.

It is known to employ a system that provides a common interface to a central processing unit among a plurality of input/output channels using a random access memory. In some instances, the random access memory includes two ports where one port is dedicated exclusively to communicating with the central processing unit and the other port is dedicated to communicating exclusively to a controller connected to the input/output channel. It is further known to employ the port associated with the central processing unit for use with one memory address area while using the port associated with the controller with a different memory address area during data transfer. Generally these two different address areas are associated with different areas within an address map.

One example of a prior art data processing system may be seen in U.S. Pat. No. 5,881,228 to Atkinson et al. Atkinson et al. teach the use of a dual port RAM chip where one port is dedicated to communicating with a host processor and the other port is dedicated to interfacing with a microcontroller.

As can be seen, there is a need for a data bus interface between a central processing unit and an input/output channel that mitigates data loss during transfer.

SUMMARY OF THE INVENTION

In one aspect of the present invention, a programmable logic device comprises a first port; a second port; a memory block operable for data communication with the first and second ports; and a pair of address areas associated with one another in the memory block.

In another aspect of the present invention, a data interface system comprises a central processing unit; a controller; a programmable logic device disposed in data communication between the central processing unit and the controller wherein, the programmable logic device includes a memory address block comprising an address divided into a pair of address areas for managing read/write operations.

In still another aspect of the present invention, a method of data processing comprises transmitting data from an input/output channel to a controller; transmitting the data from the controller to a programmable logic device configured with a memory block including a pair of address areas both associated to a common memory address space wherein the pair of address areas includes a first address area; for reading the data transmitted from the controller in the first address area during a read operation; and generating a central processing unit command in the central processing unit based on the data read in the first address area.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. Broadly, embodiments of the present invention generally provide a central processing unit (CPU) interface comprising a programmable logic device with a memory block including a pair of address areas. An exemplary embodiment of a system according to the present invention generally includes the programmable logic device in data communication with a CPU, a controller, and an input/output channel.

Figure 1:
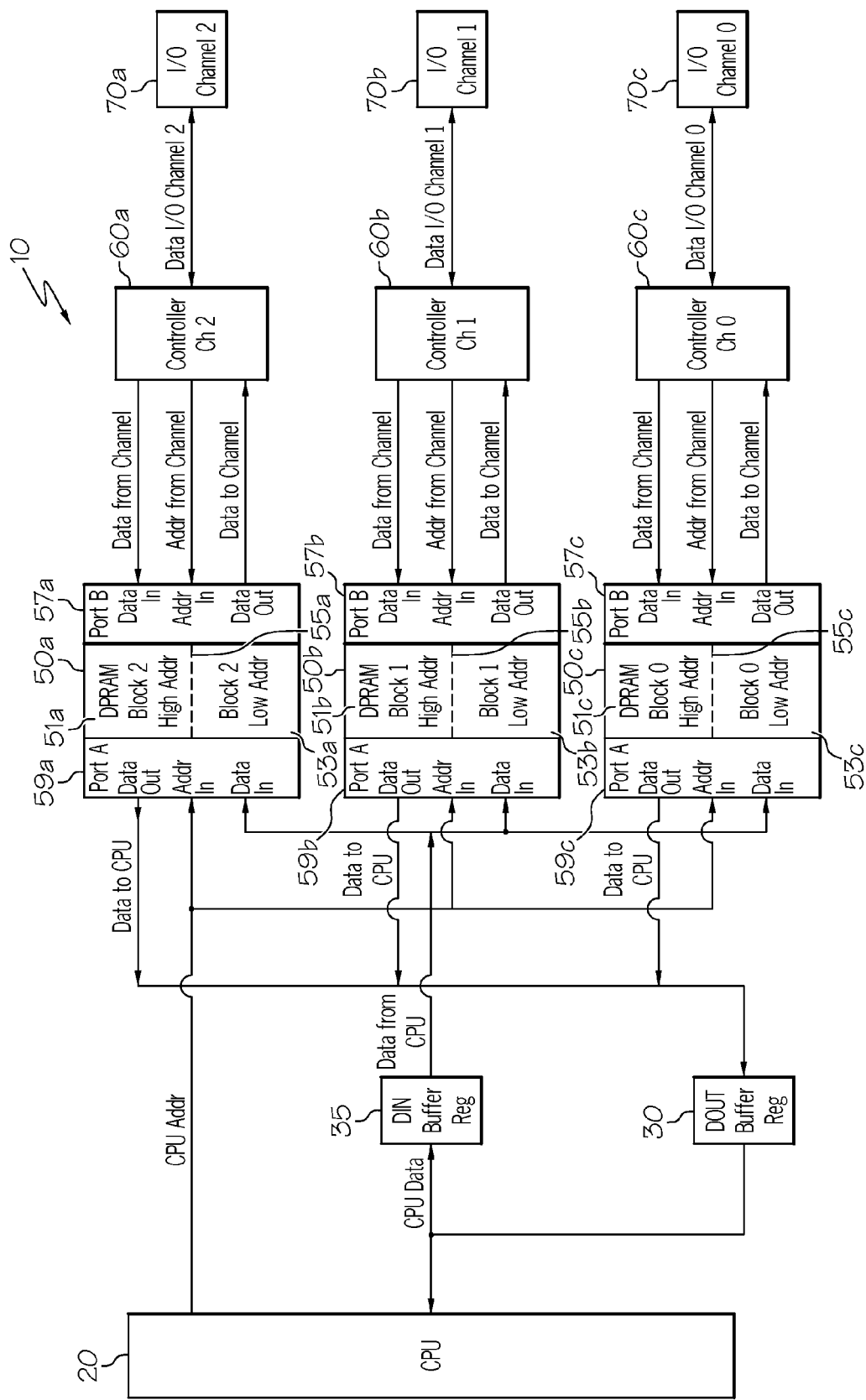
FIG. 1 depicts a schematic representation according to one exemplary embodiment of the present invention.

Referring to FIG. 1, a CPU data bus interface system 10 is shown. The CPU data bus interface system 10 may generally include a programmable logic device 50 connected in data communication between a controller 60 and a CPU 20. In the exemplary embodiment shown, three DPRAM blocks 50a; 50b; and 50c are shown connected to respective controllers 60a; 60b; and 60c which are in turn further connected to respective input/output channel devices 70a; 70b; and 70c. For ease of illustration, it will be understood that a DPRAM block 50 may represent any of the DPRAM blocks 50a; 50b; and 50c. Likewise a controller 60 may represent any of controllers 60a; 60b; and 60c and a reference to an input/output channel 70 may represent any of the input/output channels 70a; 70b; and 70c. Some exemplary input/output channels 70 may include analog to digital converters, digital to analog converters, and a universal asynchronous receiver/transmitter. Additionally, the CPU data bus interface system 10 may further include a data in buffer register 35 and a data out buffer register 30.

The DPRAM block 50 may include a memory area 55 storing memory addresses and first and second ports 57 and 59. In one exemplary embodiment, the DPRAM block 50 may be a dual port random access memory (DPRAM) chip or a field programmable gate array (FPGA). The memory space 55 may include a pair of address areas; a high address area 51 and a low address area 53. In one exemplary embodiment, the high address area 51 and the low address area 53 may be associated to one another and in turn, to a single common memory address. Each port 57, 59 may access the common memory address simultaneously, via the high address area 51 and the low address area 53 depending on whether a high address area operation or a low address area operation is being performed.

In operation, data may flow bi-directionally between the CPU 20 and the input/output channel 70. The CPU 20 or the controller 60 may access data from the DPRAM block 50 accessing the same memory address on read or write operations in different locations of the memory area 55 through the ports 57 and 59 depending on the type of computing operation desired. For example, during a CPU access operation, the high order address area 51 for a DPRAM may be substituted in for the memory address from a logic circuit which may generate a high area DPRAM address from a CPU 20 command during a read operation and the low area DPRAM address 53 may be substituted in for the memory address to generate a DPRAM address from a CPU 20 command during a write operation for the same address in a DPRAM memory map. In another exemplary operation, an input/output channel access of the DPRAM block 50 may generate a high area DPRAM address from a controller 60 command during a write operation and a low area DPRAM address from a controller 60 command during a read operation for the same address in the DPRAM memory map. Thus, a single memory address and both ports 57 and 59 may be employed for both a read operation and a write operation when data is transferred between a controller 60 and a CPU 20.

Figure 2:
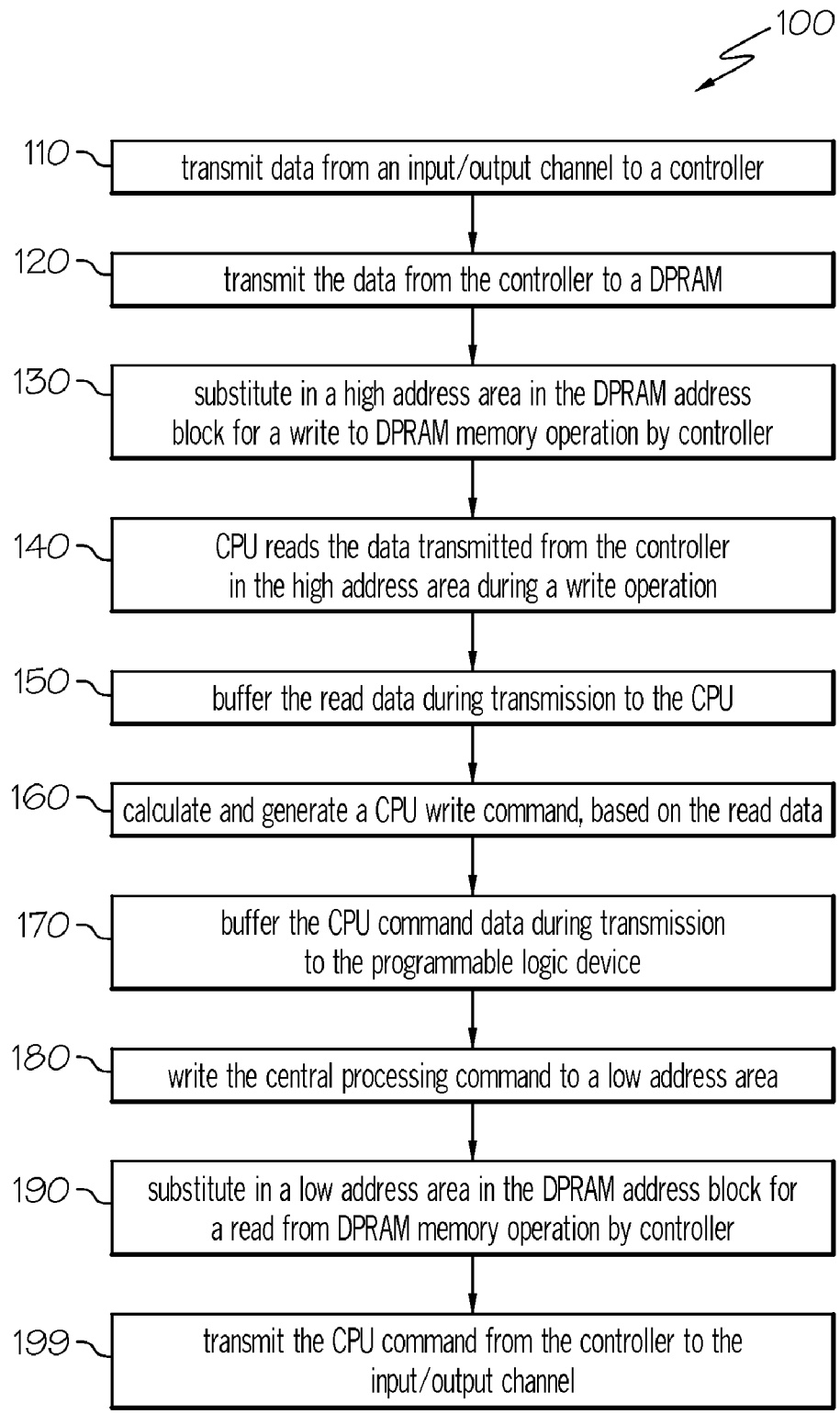
FIG. 2 illustrates a series of steps according to an exemplary method employing the present invention.

Referring to FIG. 2, a method of data processing 100 may be illustrated according to the following steps. In step 110, data may be transmitted from an input/output channel 70 to a controller 60. In step 120, the data may be transmitted from the controller 60 to a programmable logic device 50. In step 130, a high address block 51 may be substituted into the memory area 55 for a common memory address. In step 140, the data transmitted from the controller 60 may be read during a read operation in the high address area 51. In step 150, the data read during the read operation may be buffered during transmission to the CPU 20. In step 160, a high or low level CPU write command may be generated in the CPU 20 based on the data read in the high address block 51. In step 170, the CPU command data may be buffered during transmission to the programmable logic device 50. In step 180, the CPU command may be written during the write operation to the low area address 53 in the memory area 55. In step 190, the CPU command may be transmitted to the controller 60. In step 199, the CPU command may be transmitted from the controller 60 to the input/output channel 70.

While the foregoing was described primarily with illustration to a dual port random access memory structure, it should be understood that other programmable read/write devices may benefit from and employ exemplary embodiments according to the present invention as described.

It should be understood, of course, that the foregoing relates to exemplary embodiments of the invention and that modifications may be made without departing from the spirit and scope of the invention as set forth in the following claims.

I claim:

1. A programmable logic device, comprising:
   a first port;
   a second port;
   a memory block operable for data communication with the first and second ports; and
   a pair of address areas associated with one another in the memory block,
   wherein the pair of address areas includes a high address area wherein the first port is used for read operations and the second port is used for write operations, and a low address area wherein the first port is used for write operations and the second port is used for read operations.

2. The programmable logic device of claim 1 wherein the programmable logic device is a dual port random access memory.

3. The programmable logic device of claim 1 wherein the pair of address areas are associated with one memory address.

4. A data interface system, comprising:
   a central processing unit;
   a controller;
   a programmable logic device disposed in data communication between the central processing unit and the controller wherein, the programmable logic device includes a memory address area comprising an address divided into a pair of address areas for managing read/write operations, wherein the pair of address areas includes a high address area wherein a first port of the programmable logic device is used for read operations and a second port of the programmable logic device is used write operations, and a low address area wherein the first port is used for write operations and the second port is used for read operations.

5. The data interface system of claim 4 wherein the programmable logic device is a dual port random access memory.

6. The data interface system of claim 4 wherein the pair of address areas are both associated with one common memory address.

7. The data interface system of claim 4 wherein the first and second ports are interfaced respectively with the central processing unit and the controller.

8. The data interface system of claim 4 further comprising an input/output channel disposed in data communication with the controller.

9. The data interface system of claim 4 further comprising a buffer regulator disposed in data communication between the central processing unit and the programmable logic device wherein the buffer register regulates data transmitted from the central processing unit to the low address block during a write operation.

10. The data interface system of claim 4 further comprising a buffer regulator disposed in data communication between the central processing unit and the programmable logic device wherein the buffer register regulates data transmitted from the high address block to the central processing unit during a read operation.

11. The data interface system of claim 4 wherein the programmable logic device is a field programmable gate array.

12. A method of data processing, comprising:
   transmitting data from an input/output channel to a controller;
   transmitting the data from the controller to a programmable logic device configured with a memory block including a pair of address areas both associated to a common memory address space wherein the pair of address areas includes a first address area, wherein a first port of the programmable logic device is used for read operations and a second port of the programmable logic device is used for write operations, and a second address area, wherein the first port of the programmable logic device is used for write operations and the second port of the programmable logic device is used for read operation;
   reading the data transmitted from the controller in the first address area during a read operation; and
   generating a central processing unit command in the central processing unit based on the data read in the first address area.

13. The method of data processing of claim 12 wherein the step of generating a central processing command unit includes writing the central processing unit command to the second address area during a write operation.

14. The method of data processing of claim 13 further comprising a step of writing the central processing unit command to the controller from the second address area.

15. The method of data processing of claim 13 further comprising a step of buffering the data written from the central processing unit command to the second address area.

16. The method of data processing of claim 12 further comprising a step of buffering the data read from the first address area.

* * * * *